W. R. CLARK.
METHOD OF MELTING BRASS AND SIMILAR SCRAP.
APPLICATION FILED MAY 6, 1918.
1,328,712. Patented Jan. 20, 1920.
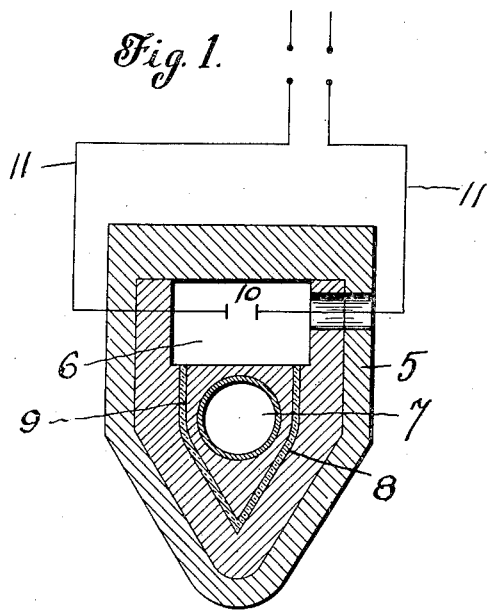
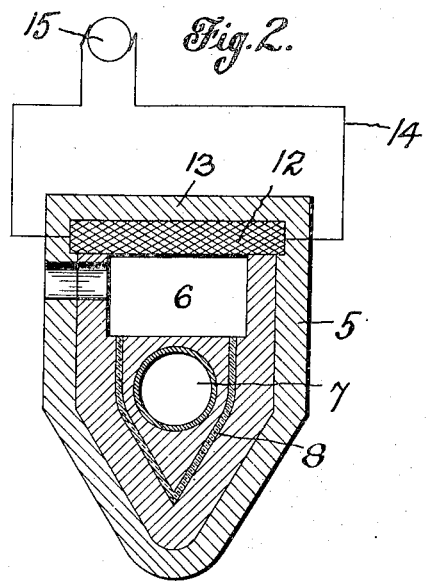
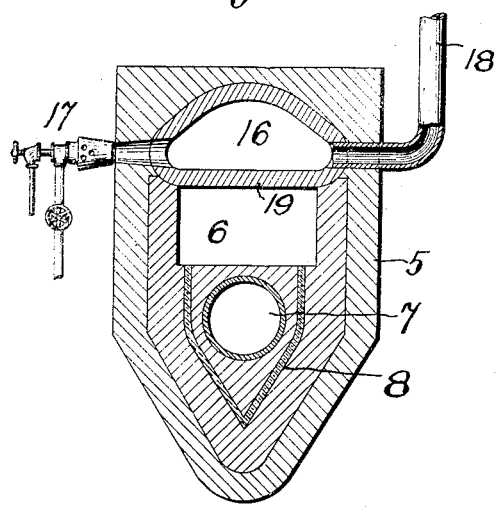
Inventor
Walter R. Clark,
By
Attorney

UNITED STATES PATENT OFFICE.

WALTER R. CLARK, OF BRIDGEPORT, CONNECTICUT, ASSIGNOR TO BRIDGEPORT BRASS COMPANY, OF BRIDGEPORT, CONNECTICUT, A CORPORATION OF CONNECTICUT.

METHOD OF MELTING BRASS AND SIMILAR SCRAP.

1,328,712.   Specification of Letters Patent.   Patented Jan. 20, 1920.

Application filed May 6, 1918. Serial No. 232,753.

*To all whom it may concern:*

Be it known that I, WALTER R. CLARK, a citizen of the United States, residing in Bridgeport, in the county of Fairfield and State of Connecticut, have invented certain new and useful Improvements in Methods of Melting Brass and Similar Scrap, of which the following is a full, clear, and exact description.

In the melting of brass turnings, shavings and similar scrap, the electric furnace of the induction type has given fairly successful and satisfactory results, particularly where a secondary consisting of a part of the molten metal of the charge is located below the main body of the charge or bath and so arranged as to promote the circulation of the bath by motor effect. It has been found, however, that in the melting of brass and similar scrap in a furnace of this kind, there is a tendency for the upper surface of the metal bath to become chilled and thereby to become hardened or incrusted, forming a bridge or arch that is separated from the molten part of the charge. Such a chilling and incrustation of the charge surface, forming an inert layer on top of the bath, is caused by the fact that the brass chips usually have a film of oil on the same or more or less dirt, which acts as an insulator in preventing the flow of current into such chips; and the air in the interstices between the fragments of scrap also acts as an insulator which separates them from the bath beneath. Naturally the separation of the upper part of the charge from the lower part causes a considerable part of the metal to remain unmelted throughout the heating of the charge or for a longer period than is conducive to proper furnace operation, and the efficiency of the furnace is cut down, the output of molten metal being less than it should be, and the power consumption greater.

The primary object of the present invention is to overcome the defects and drawbacks just noted and to provide an improved method of melting brass and similar scrap in which the tendency for the surface of the metal to chill is neutralized while at the same time preventing the heating up of the surface of the charge to such an extent as prejudicially to volatilize the zinc of the alloy.

Another object of the invention is to provide an improved furnace for melting brass and similar scrap, which is provided with means located above the surface of the charge adjacent the roof of the hearth or basin, for maintaining the surface of the charge at a predetermined temperature which is, however, less than the heat of the body of molten metal below the surface, so that the volatile constituents of the charge will not be lost.

To these and other ends, the invention consists in the novel features and steps and combinations of parts to be hereinafter described and claimed.

In the accompanying drawing,

Figure 1 is a diagrammatic vertical sectional view of an electric induction furnace which may be used in carrying out my invention; and Figs. 2 and 3 are similar views showing modifications of the furnace structure.

In the practice of my invention, I prefer to melt the brass or other scrap in an electric induction furnace of the type shown. The invention is of particular value in the melting of brass chips, turnings and the like, preliminary to casting in molds. One of the difficulties attendant upon the melting of material of this kind is that if the heat exceeds a certain temperature, the volatile constituents, such as zinc, will be converted into vapor and lost, and in order to prevent overheating, efficient means should be provided for promoting and maintaining the circulation of the molten bath. The best type of furnace for this purpose, so far as I am advised, is the electric induction type wherein a secondary of molten metal is located beneath the body part of the charge or bath and in communication therewith, the arrangement being such that the metal in the bath and in the secondary channel is circulated by motor effect in said channel.

In the drawing, I have shown diagrammatically an electric induction furnace of the above mentioned type, having a body 5 and an interior basin or hearth 6. The furnace construction is illustrated only in a diagrammatic way and I have omitted the primary core and winding which usually passes through an opening 7 located beneath the basin or chamber 6. I have shown, however, the secondary channel 8, which is in communication with the main furnace chamber at the ends of said channel, at opposite sides of the chamber. The molten metal of the charge passing down into the channel 8 forms the secondary of a transformer, being located in close proximity to the primary core and coil (not shown) in the opening 7. At the lower part of the furnace, the secondary channel preferably has an acute angle formed therein for the creation of motor effect which promotes and maintains the circulation of the entire charge. The channel 8 is preferably located in a vertical plane and is formed in a body of asbestos cement or similar insulating material within the lower part of the furnace casing.

The brass or other scrap to be melted is introduced into the furnace chamber 6 in the usual manner, making contact with a ribbon or strip 9 of metal in the secondary channel. The primary is then excited and the greater part of the charge in the furnace chamber is melted by contact with the metal of the secondary channel which rapidly becomes molten and is circulated in contact with other parts of the bath, the metal being driven out of the channel at the upper ends thereof by motor effect and being constantly replaced.

The circulation promoted in this manner in the lower part of the bath is quite efficient but, owing to the oil and dirt on the scrap metal and the air in the interstices between the fragments, the upper part of the charge may become insulated and separated from the lower part, forming a bridge or arch over the latter in the nature of a crust, which is not heated sufficiently to melt, as above pointed out. In order to overcome this drawback and the consequent loss of efficiency, I provide means for heating the upper surface of the charge from above, which means, however, while effectively heating the upper part of the charge and preventing the chilling thereof, will, nevertheless, not heat any part of the charge to such an extent as to volatilize the volatile constituents of the same. This auxiliary heating means, which is of relatively weak heating effect as compared to the induction element below the upper surface of the charge, is preferably located in the space between the upper surface of the bath and the furnace top or roof, in such a location that heat is radiated from it in a downward direction against the upper surface of the bath.

In the furnace shown in Fig. 1, the auxiliary heating effect is produced between electrodes 10 which produce an arc. These electrodes are connected with an appropriate source of current by leads 11 and they are suitably positioned and arranged in the furnace chamber above the level of the bath so as to send the heat of the arc downward against the upper surface of the charge. It will be understood, however, that the arc is of relatively weak power compared to the induction element below the main body of the charge so far as heating effect is concerned, for it is desired to slowly heat the charge by said auxiliary heating means from the surface downward, at a regularly lower rate than the heat transmitted to the charge from the induction element of the furnace. In this manner the upper surface of the bath is warmed to a moderate degree, which has no tendency to volatilize the zinc or other volatile constituent of the alloy but which, nevertheless, is of considerable advantage in preventing the chilling of the upper part of the charge and in speeding up the operation of the furnace and increasing its efficiency.

In the form of furnace shown in Fig. 2, the general principle is the same as that previously outlined but the auxiliary heating element, instead of being constituted by arc electrodes is formed by a resistance element 12, located immediately beneath the roof 13 of the furnace, above the chamber 6. The resistor 12 which may advantageously consist of carbon or similar resistor material is applied in a layer to the under surface of the furnace roof so as to be located directly over the charge of metal in the chamber 6 and it is connected by leads 14 with a suitable source of current 15.

In the form of furnace shown in Fig. 3, the heating means is constituted by a retort 16 of refractory material or the like, built into the roof portion of the furnace and which serves as a combustion chamber. This retort is heated interiorly by an oil burner 17, for example, the products of combustion passing off through a stack 18. The bottom wall 19 of the retort or combustion chamber lies directly above the furnace chamber 6 and forms a roof therefor, and by reason of the heating of said bottom wall 19 to a proper degree, determined by adjustment of the oil burner 17, the requisite amount of heat is radiated in a downward direction against the upper surface of the metal bath to produce the effects hereinbefore described.

Various changes may be made in the procedure and furnace construction herein described, without departure from the scope of the claims.

It is to be understood that when I refer to maintaining the upper surface of the charge at a temperature sufficiently low to prevent volatilization of the zinc or other volatile constituent, I mean that no appreciable, or at any rate, no harmful volatilization will take place.

I do not claim specifically herein the form of furnace shown in Fig. 2 of the drawing, claimed in my divisional application Serial No. 237,562, filed May 31, 1918. Furthermore, I do not claim herein the specific construction of the furnace shown in Fig. 3, as the same is claimed in a divisional application, Serial No. 322,557, filed September 8, 1919.

What I claim is:

1. In the method of melting brass and similar scrap in an electric induction furnace having a secondary channel, the step of warming by extraneous means the upper surface of the charge only to such an extent as to prevent the chilling and incrustation of the same.

2. In the method of melting brass and similar scrap in an electric induction furnace having a secondary channel below the upper surface of the charge, the step of heating the upper surface of the charge to prevent the chilling and incrustation of the same but at so low a temperature as to prevent prejudicial volatilization of the volatile constituent of the charge.

3. The method of melting brass and similar scrap, which comprises the melting of the charge in an electric furnace of the induction type having a secondary channel below the level of the charge, and the simultaneous heating of the upper surface of the charge in the furnace chamber from above to a temperature sufficient to prevent chilling or incrustation of the upper surface of the metal bath but insufficient prejudicially to volatilize the zinc.

4. The method of melting metal having a volatile constituent, which comprises introducing the same into a suitable furnace chamber, inducing heating current in the lower part of the charge, and heating the upper surface of the charge from above to an extent which will keep the upper surface from becoming chilled but which will not volatilize injuriously the volatile content of the metal.

5. The method of melting metal of a volatile character, which comprises introducing the same into a suitable furnace chamber, inducing an electric current in the lower part of the charge, and simultaneously heating the upper surface of the charge from above by extraneous heating means of less heating effect than such electric current, whereby the upper part of the charge is maintained at such a temperature as to avoid volatilization thereof to a prejudicial extent.

6. The method of melting brass scrap for casting, which comprises introducing the same into a suitable furnace chamber, inducing a heating current in the charge and circulating the latter rapidly, and simultaneously heating the charge from above by the application of heat from an extraneous source which is of insufficient heating effect to volatilize the zinc in the metal.

In witness whereof, I have hereunto set my hand, on the 3rd day of May, 1918.

WALTER R. CLARK.